United States Patent [19]

Karrasch et al.

[11] Patent Number: 4,792,315
[45] Date of Patent: Dec. 20, 1988

[54] DRIVE SHAFT ASSEMBLY FOR OUTBOARD MOTOR

[76] Inventors: Wallace R. Karrasch, 6850 N. Glen Shore Dr., Milwaukee, Wis. 53209; Kennedy K. McElroy, 1718 Hazelwood, Lindenhurst, Ill. 60046; Steven R. McNeill, 3808 Glen Flora, Waukegan, Ill. 60085

[21] Appl. No.: 947,106

[22] Filed: Dec. 29, 1986

[51] Int. Cl.⁴ .............................. B63H 23/34
[52] U.S. Cl. .............................. 440/83
[58] Field of Search .............. 464/179–183; 440/75, 76, 78, 112, 83, 900; 403/299, 361, 359

[56] References Cited

U.S. PATENT DOCUMENTS

| | | | |
|---|---|---|---|
| 687,676 | 11/1901 | Culver | 464/182 |
| 1,843,089 | 1/1932 | Peek | 440/76 |
| 2,549,484 | 4/1951 | Kiekhaefer | 440/78 |
| 3,083,680 | 4/1963 | Willis et al. | 115/34 |
| 3,138,010 | 6/1964 | Shipley et al. | 64/1 |
| 3,175,374 | 3/1965 | Toelke | 64/1 |
| 3,209,720 | 10/1965 | Campbell et al. | 115/.5 |
| 3,931,783 | 1/1976 | Croisant | 440/75 |
| 4,112,866 | 9/1978 | Liaaen | 115/34 |
| 4,127,080 | 11/1978 | Lakiza et al. | 115/76 |
| 4,272,971 | 6/1981 | Loyd et al. | 64/1 |
| 4,358,284 | 11/1982 | Federmann et al. | 464/181 |
| 4,421,497 | 12/1983 | Federmann et al. | 464/183 |
| 4,527,978 | 7/1985 | Zackrisson | 464/183 |

*Primary Examiner*—Joseph F. Peters, Jr.
*Assistant Examiner*—Edwin L. Swinehart

[57] ABSTRACT

Disclosed herein is a marine propulsion device adapted to be mounted to the transom of the boat, the marine propulsion device comprising an engine, a rotatably mounted propeller, and a drive shaft assembly drivingly connecting the engine to the propeller, the drive shaft assembly including a lower drive shaft member having a lower end coupled to the propeller and having a threaded upper end, the drive shaft assembly further including an upper drive shaft member having a threaded lower end for threadedly engaging the threaded upper end of the lower drive shaft member.

21 Claims, 1 Drawing Sheet

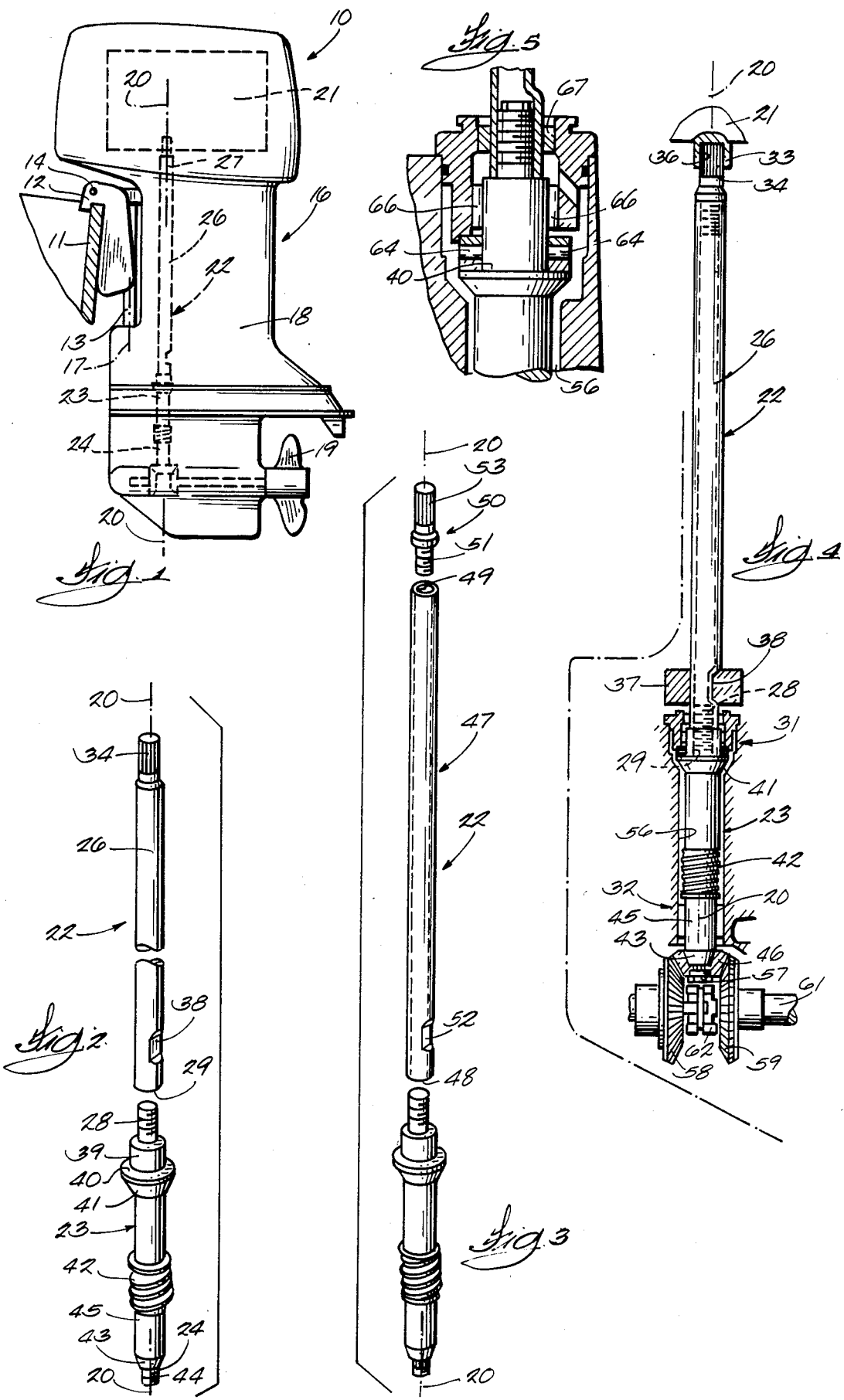

DRIVE SHAFT ASSEMBLY FOR OUTBOARD MOTOR

BACKGROUND OF THE INVENTION

This invention relates generally to marine propulsion devices, such as outboard motors, and, more particularly, to a drive shaft assembly for use in such a marine propulsion device.

Drive shafts in conventional outboard motors are typically provided with one or more bearing races adjacent their lower ends and are exposed to corrosive water and exhaust gases at their upper ends. To provide improved lower end wear characteristics in conjunction with improved upper end corrosion resistance, prior drive shafts have been manufactured by inertially welding a lower drive shaft member of carbon steel to an upper drive shaft member of stainless steel. However, inertia welding is disadvantageous in that it requires costly secondary operations such as machining, heat treating and straightening.

Attention is directed to the following U.S. Pat. No.:
Zackrisson 4,527,978 July 9, 1985
Federmann et al. 4,358,284 Nov. 9, 1982
Loyd et al. 4,272,971 June 16, 1981
Lakiza et al. 4,127,080 Nov. 28, 1978
Liaaen 4,112,866 Sept. 12, 1978
Campbell et al. 3,209,720 Oct. 5, 1965
Toelke 3,175,374 March 30, 1965
Shipley et al. 3,138,010 June 23, 1964
Willis, Jr., et al. 3,083,680 April 2, 1963

SUMMARY OF THE INVENTION

The invention provides a marine propulsion device adapted to be mounted on the transom of a boat, the marine propulsion device comprising an engine, a rotatably mounted propeller, and a drive shaft assembly drivingly connecting the engine to the propeller, the drive shaft assembly including a lower drive shaft member having a lower end coupled to the propeller and having a threaded upper end, the drive shaft assembly further including an upper drive shaft member having a threaded lower end for threadedly engaging the threaded upper end of the lower drive shaft member.

The invention also provides a drive shaft assembly for a marine propulsion device, the drive shaft assembly comprising an elongate intermediate drive shaft member having first and second ends, an elongate wear resistant lower drive shaft member threadedly mounted to the first end in substantially colinear alignment with the intermediate member, and an upper insert formed of a corrosion resistant material mounted to the second end in substantially colinear alignment with the intermediate member.

The invention also provides, in a marine propulsion device, a drive shaft assembly comprising a lower drive shaft member having a threaded upper end and an upper drive shaft having a threaded lower end for threadedly engaging the threaded upper end of the lower drive shaft member.

In one embodiment, the lower drive shaft member is formed of a wear resistant metal such as carbon steel, and the upper drive shaft member is formed of a corrosion resistant metal such as stainless steel.

In one embodiment, the marine propulsion device includes an engine having a rotatable crank shaft, and the upper drive shaft member includes an upper end opposite the threaded lower end and further includes coupling means adjacent the upper drive shaft member upper end for coupling the upper drive shaft member to the rotatable drive shaft for co-rotation with the rotatable crank shaft.

In one embodiment the upper drive shaft member comprises a single, solid, elongate shaft having therein formed the threaded lower end and the coupling means.

In one embodiment the upper drive shaft comprises an elongate tube having first and second ends, the first end comprising the threaded lower end and the second end including a solid insert carrying the coupling means.

In one embodiment, the second end of the tube is threaded and threadedly engages the solid insert.

It is a feature of the present invention to provide a new and improved drive shaft assembly wherein two types of metal having different properties are joined together with threads.

It is another feature of the present invention to provide a marine propulsion device drive shaft assembly allowing the use of either solid members or hollow tubing to save weight and reduce drive shaft vibration.

Various other principal features of the invention will become apparent to those skilled in the art upon review of the following detailed description, claims, and drawings.

BRIEF DESCRIPTION OF THE DRAWINGS

FIG. 1 is a side elevational view of a marine propulsion device which includes a drive shaft assembly and which embodies various of the features of the invention.

FIG. 2 is an exploded perspective view of one embodiment of the drive shaft assembly used in the marine propulsion device shown in FIG. 1.

FIG. 3 is an exploded perspective view of another embodiment of a drive shaft assembly used in the marine propulsion device of FIG. 1.

FIG. 4 is a fragmentary side elevational view of the marine propulsion device illustrated in FIG. 1 showing the mounting of the drive shaft assembly within the marine propulsion device.

FIG. 5 is in enlarged fragmentary view, similar to FIG. 4, showing a bearing assembly for supporting the drive shaft assembly in the marine propulsion device.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DESCRIPTION OF THE PREFERRED EMBODIMENT

A marine propulsion device 10 embodying the invention is illustrated in the drawings. As best shown in FIG. 1, the marine propulsion device 10 comprises a mounting assembly fixedly attached to the transom 11 of a boat. While various suitable mounting assemblies can be employed, in the preferred embodiment, the mounting assembly includes a transom bracket 12 fixedly attached to the transom 11, and a swivel bracket 13 mounted on the transom bracket 12 for pivotal movement of the swivel bracket 13 relative to the transom bracket 12 about a generally horizontal tilt axis 14.

The marine propulsion device 10 further comprises a propulsion unit 16 mounted on the swivel bracket 13 for pivotal movement of the propulsion unit 16 relative to the swivel bracket 13 about a generally vertical steering axis 17. The propulsion unit 16 includes a lower unit 18 having a rotatably mounted propeller 19, and further includes an internal combustion engine 21 mounted on the lower unit 18. Power developed by the internal combustion engine 21 is coupled to the rotatable propeller 19 by means of a drive shaft assembly 22 drivingly connecting the engine to the propeller.

The drive shaft assembly 22 is mounted for rotation around a substantially vertical rotational axis 20 and includes a lower drive shaft member 23 having a lower end 24 coupled to the propeller 19. The drive shaft assembly 22 further includes an upper drive shaft member 26 having an upper end 27 coupled to the internal combustion engine 21. As best seen in FIG. 2, the lower drive shaft member 23 includes an externally threaded upper end 28, while the upper drive shaft member 26 includes an internally threaded lower end 29 for engaging the threaded upper end 28 of the lower drive shaft member 23. Preferably, the threads are arranged so as to tighten during ordinary rotation of the drive shaft assembly 22.

The mounting of drive shaft assembly 22 within the marine propulsion device 10 is illustrated in FIG. 4. As shown, the lower drive shaft member 23 is mounted for rotation within the lower unit 18 by means of a pair of bearing assemblies 31 and 32 engaging the drive shaft lower member 23 adjacent the upper end 28 and lower end 24 respectively. Because the bearing assemblies 31 and 32 each bear against the lower drive shaft member 23, the lower drive shaft member is preferably formed of a wear-resistant metal, such as carbon steel, exhibiting good bearing surface characteristics.

As further illustrated in FIG. 4, the internal combustion engine 21 includes a downwardly extending rotatable crankshaft 33, and the upper drive shaft member 26 includes coupling means for coupling the upper drive shaft member for co-rotation with the rotatable crankshaft. While various suitable means are available, the coupling means preferably comprises a splined shaft 34 formed at the upper end of the upper drive shaft member 26 and dimensioned to be received within an internally splined recess 36 formed in the end of the crankshaft 33. The upper drive shaft member 26 is freely supported between the crank shaft 33 and the threaded upper end 28 of the lower drive shaft member 23. Preferably, an impeller type water pump 37 is drivingly coupled to the drive shaft assembly 22 adjacent the lower end 29 of the upper drive shaft member 26 and functions to circulate cooling water through the marine propulsion device 10 upon rotation of the drive shaft assembly 22. A flat keyway 38 is formed adjacent the lower end of the upper drive shaft member 26 and provides a means for engaging and driving the water pump 37.

Because, in most outboard propulsion devices, the portion of the drive shaft assembly 22 represented by the upper drive shaft member 26 is at least partially exposed to potentially corrosive cooling water and to highly corrosive exhaust gases developed by the internal combustion engine 21, the upper drive shaft member 26 is preferably formed of a corrosion-resistant metal such as stainless steel. Because the upper drive shaft member 26 is freely supported between the engine crank shaft 33 and the threaded upper end 28 of the lower drive shaft member 23, no additional support bearings are required and, therefore, the wear and bearing surface properties of the upper drive shaft member 26 are of lesser concern than are its corrosion-resistant properties.

The construction details of the drive shaft assembly 22 are illustrated in FIG. 2. As shown, the upper drive shaft member 26 comprises an elongate, unitary, substantially cylindrical, solid length of corrosion-resistant metal having the splined shaft 34 integrally formed at one end in colinear alignment with the remainder of the member. Similarly, the keyway 38 is formed directly in the side of the member 26 through a suitable process such as milling or forging. Finally, the threaded lower end 29 is directly formed in the lower end of the upper drive shaft member 26 through the process of boring and tapping.

The lower drive shaft member 23 also comprises a generally cylindrical, elongate, unitary structure, and includes at its uppermost end, the threaded upper end 28. Immediately beneath the threaded upper end 28, a first bearing race 39 is provided and comprises a cylindrical region of relatively greater diameter coaxially disposed with respect to the rotational axis 20. The lower drive shaft member 23 further includes a horizontally disposed, annular thrust bearing race 40 immediately adjacent the lower end of the first bearing race 39. The thrust bearing race 40 is defined by means of a frusto-conical section 41 integrally formed in the lower drive shaft member 23 immediately below the first bearing race 39.

Between the thrust bearing race 40 and the lower end 24, the lower drive shaft member 23 further includes a coarsely threaded region 42 which acts, in cooperation with the marine propulsion device lower unit 18, as an Archimedes screw to help force fluid lubricant into the upper bearing assembly 31 during operation of the marine propulsion device. Finally, the lower end 24 of the lower drive shaft member 23 includes a colinearly aligned tapered region 43 and threaded region 44 by means of which a beveled pinion 46 (FIG. 4) can be mounted for co-rotation with the drive shaft assembly 22.

In use, the lower drive shaft member 23 is threaded into the upper drive shaft member 26 to form a unitary drive shaft assembly 22 which can then be utilized within the marine propulsion device 10 to couple or transmit energy from the internal combustion engine 21 to the propeller 19.

An alternate embodiment of the drive shaft assembly 22 is illustrated in FIG. 3. In this embodiment, the lower drive shaft member 23 is preferably generally identical to that shown and described with respect to FIG. 2. However, to reduce weight and vibration as well as to improve manufacturing economy, the upper drive shaft member 26 is replaced with an elongate intermediate member 47 having first and second ends 48 and 49, respectively, and by an upper insert 50 carried at the second or upper end 49 of the intermediate member 47. Preferably, the intermediate member 47 comprises a length of rigid tubing of substantially circular cross-section, and the first and second ends 48 and 49 are each internally threaded. The threads at the first or lower end 48 are dimensioned to engage the threaded end 28 of the lower drive shaft member 23 while the threads at the second or upper end 49 are dimensioned to engage an externally threaded portion 51 formed at the lower end of the upper insert 50. A keyway 52, corresponding to the keyway 38 in the solid upper drive shaft member 26 of FIG. 2, is stamped into the side of the intermediate drive shaft member 47 adjacent the threaded first or lower end 49. Preferably, the intermediate drive shaft member 47 is formed of a corrosion-resistant metal such as stainless steel.

The upper insert 50 is also formed of a corrosion-resistant material such as stainless steel and comprises a solid, substantially cylindrical member. In addition to the externally threaded portion 51, the upper insert 50 further includes an externally splined upper end 53 for engaging the splined recess 36 in the crankshaft 33. The upper insert 50 is configured such that, when it is threaded into the upper end of the intermediate drive shaft member 47, the splined end 53 is coaxially aligned with the axis of the intermediate member 47 and the lower drive shaft member 23. Preferably, the threading at both the upper and lower ends of the intermediate drive shaft member is such that the threaded joints tighten as the drive shaft assembly 22 rotates during use.

When mounted within the marine propulsion device 10 as illustrated in FIG. 4, the lower drive shaft member 23 is closely received in a bore 56 formed in the lower unit 18, and the coarse threads 42 cooperate with the bore to force lubricant into the upper and lower bearing assemblies 31 an 32. The beveled pinion 45 is mounted to the lower end 24 of the drive shaft lower member 23 by means of a nut 57 and is positioned so as to engage a pair of beveled gears 58 and 59 disposed around a horizontal propeller shaft 61. An arrangement of shiftable dogs 62 is provided for selectively coupling either gear 58 or 59 to the propeller shaft 61 so as to provide control over the direction of rotation of the propeller 19.

The lower bearing assembly 32 comprises a plurality of vertically disposed, parallel, needle-bearing rollers 63 disposed circumferentially around the lower drive shaft member 23 in the space between the sidewalls of the bore 56 and the lower bearing race 45. Thus, as the drive shaft rotates, the lower bearing race 45 engages the needle rollers 63 to rotatably support the lower drive shaft member 23.

The construction details of the upper bearing assembly 31 are illustrated in FIG. 5. As shown, a first thrust bearing assembly comprising a plurality of horizontally disposed rollers 64 is mounted within the lower unit 18 so as to bear against the thrust bearing race 40 formed adjacent the upper end of the lower drive shaft member 23. Additionally, a plurality of vertical, parallel, needle-bearing rollers 66 are disposed above the thrust bearing rollers 64 around the upper bearing race 39. Preferably, an oil seal 67 is provided for preventing the leakage of lubricant substantially beyond the upper bearing assembly 31.

When the drive shaft assembly 22 is mounted in this manner, both the thrust bearing race 40 and the upper bearing race 39 are each subjected to wear during engine operation. Because each of these races is formed of a suitable wear-resistant material such as carbon steel, wear can be considerably reduced.

Because the drive shaft assembly herein described permits the use of dissimilar materials at the upper and lower ends of the assembly, it is possible to construct a drive shaft wherein materials having particular, desired characteristics can be used so as to best exploit those characteristics. Thus, in the lower drive shaft member 23 wherein wear rather than corrosion is of primary concern, carbon steel exhibiting excellent wear characteristics can be utilized. Similarly, in the upper drive shaft member 26, as well as in the intermediate member 47 and upper insert 52, stainless steel can be used to best resist the corrosive environment in which this portion of the drive shaft assembly is typically disposed. Because the threaded joints between the various members of the drive shaft assemblies can be easily formed, and because once formed, the threaded members can be easily and economically assembled, the disadvantages associated with the prior technique of inertia welding dissimilar drive shaft metals to one another have been substantially eliminated.

Various other features and advantages of the invention are set forth in the following claims.

We claim:

1. A marine propulsion device adapted to be mounted to the transom of a boat, said marine propulsion device comprising an engine, a rotatably mounted propeller, and a drive shaft assembly drivingly connecting said engine to said propeller, said drive shaft assembly including a lower drive shaft having a lower end coupled to said propeller for transmission of rotary power from said lower end of said drive shaft to said propeller, said lower drive shaft also having an integral threaded upper end, said drive shaft assembly further including an upper drive shaft having an integral threaded lower end, one of said threaded lower end of said upper drive shaft and said threaded upper end of said lower drive shaft being threadedly engaged into the other of said threaded lower end of said upper drive shaft and said threaded upper end of said lower drive shaft.

2. A marine propulsion device according to claim 1 wherein said lower drive shaft member is formed of a first metal and said upper drive shaft member is formed of a second metal, said second metal being different from said first metal.

3. A marine propulsion device according to claim 2 wherein said first metal comprises a wear resistant metal and said second metal comprises a corrosion resistant metal.

4. A marine propulsion device according to claim 3 wherein said first metal comprises carbon steel and said second metal comprises stainless steel.

5. A marine propulsion device according to claim 1 wherein said engine includes a rotatable crank shaft and said upper drive shaft member includes an upper end opposite said threaded lower end and further includes coupling means adjacent said upper end of said upper drive shaft member for coupling said upper drive shaft member to said rotatable crank shaft for co-rotation with said rotatable crank shaft.

6. A marine propulsion device according to claim 5 wherein said upper drive shaft member comprises a single, solid, elongate shaft having therein formed said threaded lower end and said coupling means.

7. A marine propulsion device according to claim 5, wherein said upper drive shaft member comprises an elongate tube having first and second ends, said first end comprising said threaded lower end and said second end including a solid insert carrying said coupling means.

8. A marine propulsion device according to claim 7 wherein said insert includes a threaded end and wherein said second end of said tube is threaded and threadedly engages said threaded end of said solid insert.

9. A drive shaft assembly for a marine propulsion device, said drive shaft assembly comprising a lower drive shaft having an integral threaded upper end and a lower end including means for transmitting power to a propeller and further comprising an upper drive shaft having an integral threaded lower end, one of said threaded lower end of said upper drive shaft and said threaded upper end of said lower drive shaft being threadedly engaged into the other of said threaded lower end of said upper drive shaft and said threaded upper end of said lower drive shaft.

10. A drive shaft assembly according to claim 9, wherein said lower drive shaft member is formed of a wear resistant material and said upper drive shaft member is formed of a corrosion resistant material.

11. A drive shaft assembly according to claim 10 wherein said wear resistant material comprises carbon steel and wherein said corrosion resistant material comprises stainless steel.

12. A drive shaft assembly according to claim 9, wherein the marine propulsion device includes an engine having a rotatable crankshaft and wherein said upper drive shaft member includes an upper end opposite said threaded lower end and further includes coupling means adjacent said upper end of said upper drive shaft assembly for coupling said upper drive shaft to said rotatable crankshaft for co-rotation with said rotatable crankshaft.

13. A drive shaft assembly according to claim 12 wherein said upper drive shaft member comprises a single, solid, elongate shaft having therein formed said threaded lower end and said coupling means.

14. A drive shaft assembly according to claim 12 wherein said upper drive shaft member comprises an elongate tube having first and second ends, said first end comprising said threaded lower end and said second end including a solid insert carrying said coupling means.

15. A drive shaft assembly according to claim 14 wherein said second end of said tube is threaded and threadedly engages said solid insert.

16. A drive shaft assembly for a marine propulsion device, said drive shaft assembly comprising an elongate intermediate drive shaft having an integral first threaded end and a second end, an elongate wear resistant lower drive shaft having an integral threaded end, extending in substantially co-linear alignment with said intermediate drive shaft, and adapted to transmit power, one of said threaded end of said lower drive shaft and said threaded end of said intermediate drive shaft being threadedly engaged into the other of said threaded end of said lower drive shaft and said threaded end of said intermediate drive shaft, and an upper insert formed of a corrosion resistant material mounted to said second end of said intermediate drive shaft in substantially co-linear alignment therewith.

17. A drive shaft assembly according to claim 16 wherein the marine propulsion device includes a rotatable crankshaft and wherein said upper insert is adapted for coupling to said crankshaft for co-rotation of said drive shaft assembly with said rotatable crankshaft.

18. A drive shaft assembly according to claim 17 wherein said lower drive shaft member includes a thrust bearing race.

19. A drive shaft assembly according to claim 17, wherein said upper insert is threadedly mounted to said second end of said intermediate drive shaft member.

20. A drive shaft assembly according to claim 17 wherein said intermediate drive shaft member comprises a substantially hollow tube having a hollow interior and said first and second ends each comprise an internally threaded region along said interior adjacent the ends of said tube.

21. A drive shaft assembly for a marine propulsion device including a rotatable crankshaft, said drive shaft assembly comprising an upper drive shaft including an elongate, substantially solid main portion having an integral threaded lower end and an upper portion adapted for coupling to the crankshaft for co-rotation of said drive shaft assembly with the rotatable crankshaft, and said upper portion being formed of a corrosion resistant material, extending in substantially co-linear alignment with said main portion and being integral with said main portion, and an elongated wear resistant lower drive shaft in substantially co-linear alignment with said upper drive shaft and including an integral threaded upper end, one of said threaded end of said lower drive shaft and said threaded end of said upper drive shaft being threadedly engaged into the other of said threaded end of said lower drive shaft and said threaded end of said upper drive shaft.

* * * * *

UNITED STATES PATENT AND TRADEMARK OFFICE
CERTIFICATE OF CORRECTION

PATENT NO. : 4,792,315

DATED : December 20, 1988

INVENTOR(S) : Karrasch, et al.

It is certified that error appears in the above—identified patent and that said Letters Patent is hereby corrected as shown below:

On the cover page, item [73]:

Assignee: OUTBOARD MARINE CORPORATION
Waukegan, Illinois

Signed and Sealed this

Thirteenth Day of August, 1996

Attest:

BRUCE LEHMAN

*Attesting Officer*      *Commissioner of Patents and Trademarks*